April 3, 1956  W. LE ROY HENDERSON  2,740,905
REACTIVE DEVICE
Filed Jan. 4, 1954
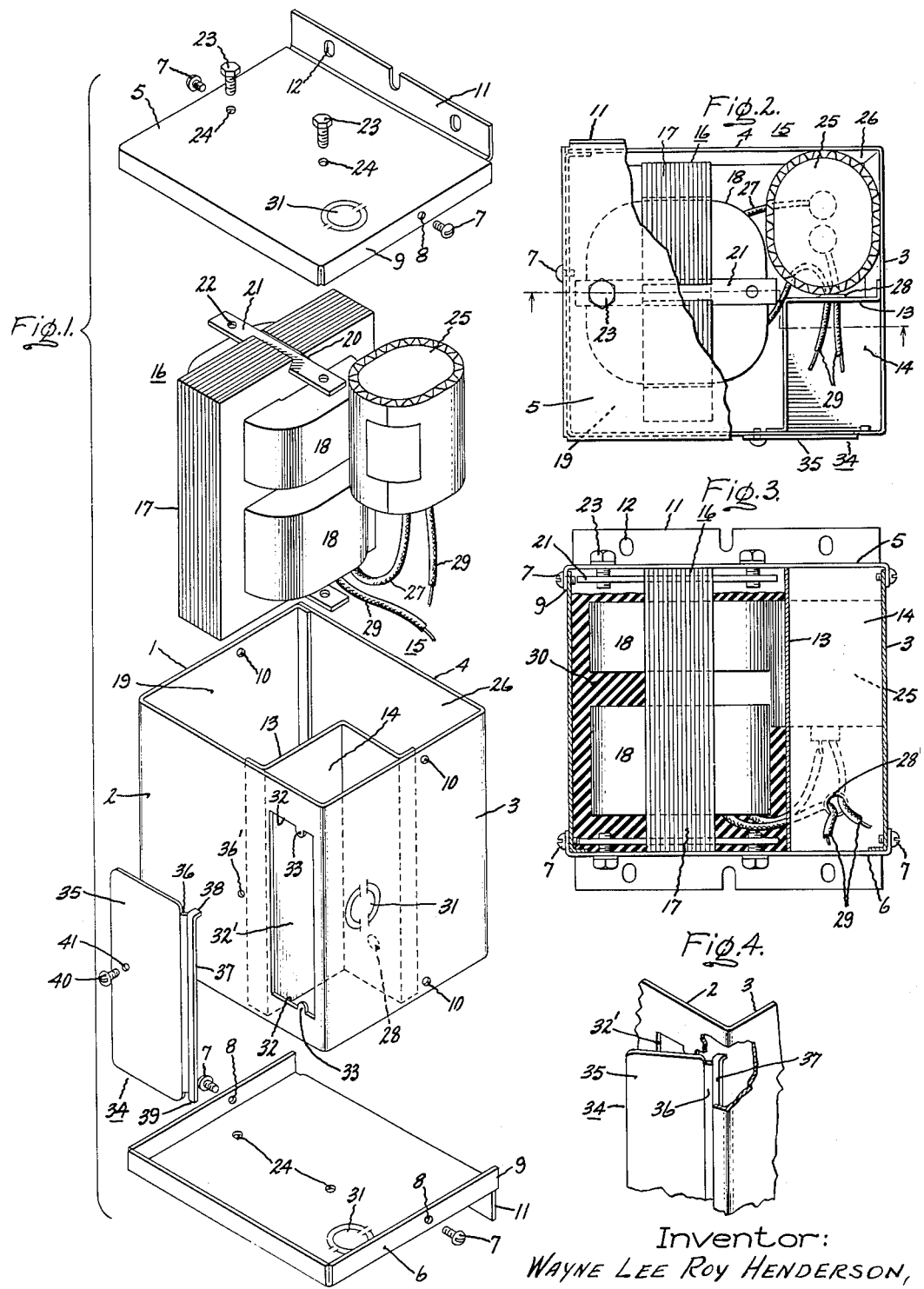
Inventor:
WAYNE LEE ROY HENDERSON,
by *Robert G. [Iris]*
His Attorney.

United States Patent Office 2,740,905
Patented Apr. 3, 1956

2,740,905

REACTIVE DEVICE

Wayne Le Roy Henderson, Fort Wayne, Ind., assignor to General Electric Company, a corporation of New York Application January 4, 1954, Serial No. 401,886

11 Claims. (Cl. 307—156)

The invention relates to the reactive devices, such as ballast transformers for gaseous discharge lamps and more particularly to the mounting and enclosing arrangements for such devices.

Ballast transformers for gaseous discharge lamps, for example mercury vapor lamps, are generally provided with a laminated core and coils and a capacitor is conventionally closely associated with the transformer to provide power factor correction. In order to protect the transformer and its associated capacitor from physical damage, it is desirable that they both be enclosed in an outer casing member with means being provided to mount the complete assembly in any position, i. e. vertically or horizontally. It is further necessary to provide a junction box for making connections between the external leads and the transformer and capacitor and it is desirable that this junction box be readily accessible for convenience in making these connections. It is further desirable that this assembly have minimum size and weight and be simple and inexpensive to manufacture.

In the past, ballast transformer assemblies for mercury vapor lamps have conventionally been constructed with the "cap-core-cap" construction. In this type of construction, two casing sections were provided respectively covering the coils only thus leaving the edges of the transformer core exposed. The capacitor was positioned in one of these cases and mounting means were respectively provided on the two casing members in order to support the assembly. This construction required that an opening be provided in each casing member in order to make the necessary connections which further required that extra turns with duplicate taps be provided on the transformer coils. Because of the requirement for entering both casing members for making connections, it was difficult to surround the coils with potting compound resulting in poor heat transfer by virtue of the dead air space surrounding the coils. This in turn required the use of more basic materials in order to permit operation within allowable temperature limits. This assembly was held together by through-bolts extending through the core and at right angles thereto and thus the weight of the device was supported at right angles to the core thereby tending to pull the laminations apart.

It is therefore desirable to provide ballast transformer and capacitor assembly in a unitary case which permits the introduction of potting compound in order to improve heat transfer and reduce the overall size weight of the assembly. It is further desirable that a single junction box be provided for making all connections and this box be accessible from three sides. Finally, it is desirable that in such an assembly, all of the weight be supported by the core in the plane of the core laminations so that there is no tendency to separate the laminations.

It is therefore an object of this invention to provide an improved reactive device assembly incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides an enclosing case having side walls and top and bottom walls, the top and bottom walls being preferably removably secured to the side walls and preferably having mounting portions formed thereon. An inner partition is provided in the case defining a junction box compartment and an inner compartment. This partition preferably extends from the top to the bottom of the case joining two of the side walls thus defining the junction box compartment in a corner of the case with the inner compartment being substantially L-shaped. A reactive device having a core and coils is positioned in the inner compartment and is preferably vertically arranged. The core is secured to at least one of the outer walls and preferably to the top and bottom walls so the reactive device is supported in the plane of its core. A capacitor is also positioned in the inner compartment and is connected to the reactive device. The inner partition has an opening formed therein communicating between the inner compartment and the junction box compartment so as to admit leads from the reactive device and the capacitor to junction box compartment. The inner compartment may be filled with a mass substantially of solidified insulating material which incases the reactive and capacitor devices. One of the outer walls has an opening formed therein communicating with the junction box compartment permitting access thereto for making connections and a closure member is provided for this opening. The top and bottom walls and another of the side walls are preferably provided with means for admitting external leads to the junction box compartment.

In the drawing,

Fig. 1 is an exploded view in perspective illustrating the improved assembly of this invention;

Fig. 2 is a top view, partly broken away, further illustrating the improved assembly of this invention;

Fig. 3 is a side elevational view, partly in section, further showing the invention; and Fig. 4 is a fragmentary view in perspective, partly broken away, further illustrating the improved hinge arrangement for the closure member of the junction box compartment.

Referring now to Figs. 1, 2 and 3, there is shown an enclosing case having side walls 1, 2, 3 and 4 and top and bottom walls 5 and 6. The side walls and top and bottom walls are preferably formed of relatively thin sheet metal, such as steel, and are fabricated by means well known in the art. Top and bottom walls 5 and 6 are preferably removably connected to the side walls by means of screws 7 which pass through openings 8 in side flanges 9 of top and bottom walls 5 and 6 and engage tapped holes 10 in side walls 1 and 3. It will be readily understood that top and bottom walls 5 and 6 can be removably secured to the side walls in any other convenient manner. Top and bottom walls 5 and 6 are respectively provided with upwardly and downwardly extending mounting flanges 11 having suitable mounting openings 12 formed therein for mounting the complete assembly in any desired position.

As inner partition 13 is provided joining and secured to side walls 2 and 3 in any convenient manner, as by spot welding. Inner partition 13 extends from the top to the bottom of the side walls and defines a junction box compartment 14 in the corner of the case defined by side walls 2 and 3 and an inner substantially L-shaped compartment 15.

A reactive device 16, shown here as being a high leakage reactance autotransformer is provided having a core 17 formed of a plurality of relatively thin laminations of magnetic material, and suitable coils 18. Any one of numerous well known types of coil combinations may be utilized and the reactive device 16 will therefore not be further discussed in detail here. Reactive device 16 is vertically arranged in one leg 19 of L-shaped inner compartment 15, as best seen in Fig. 2. Transverse notches 20 are formed in the top and bottom edges of core 17 and transverse mounting members 21 are positioned therein extending respectively on either side of core 17. Mounting members 21 are provided with tapped openings 22 in their ends which are engaged by suitable screws 23 passing through aligned openings 24 in the top and bottom walls 5 and 6. It is thus seen that the reactive device 16 is supported by the top and bottom walls 5 and 6 in the plane of the laminations of core 17 so that there is no tendency for the laminations to separate.

A suitable capacitor 25 is positioned in the other leg 26 of L-shaped compartment 15 and is suitably connected to coils 18 of transformer 16 by a lead 27. It will be readily understood that the circuit of transformer 16 and capacitor 25 does not form a part of this invention and that lead 27 is therefore shown for illustrative purposes only. Partition 13 has an opening 28 formed therein between the junction box 14 and the L-shaped inner compartment 15. Leads 29 from the capacitor 25 and transformer 16 are admitted to the junction box compartment 14 through opening 28. In order to provide for suitable heat transfer from the reactive device 16, the L-shaped compartment 15 is preferably filled with a suitable substantially solidified insulating material 30, commonly referred to as potting compound. This compound will surround and encase the core 17 and coils 18 and the capacitor 25 thus conducting the heat generated in the transformer 16 to the outer walls for dissipation to the surrounding air.

In order to bring external leads into the junction box 14 for connection to the internal leads 29, knock-outs 31 are provided in top and bottom walls 5 and 6 and in side wall 3 communicating with the interior of junction box compartment 14. Thus, the junction box compartment 14 is accessible from three sides for the connection of external leads by means of conventional conduit or cable.

In order to provide access to junction box 14 for making the required internal connections, an opening 32' is provided in side wall 2 communicating with the interior of junction box 14. The upper and lower edges 32 of opening 32' are provided with small projections 33 the function of which will be hereinafter described. A closure member 34 is provided for opening 32' comprising a flat portion 35 which overlies opening 32', an intermediate portion 36 and an end portion 37. It will be seen that intermediate portion 36 is in a plane at an angle to the plane of flat portion 35 and is shorter than the edge of flat portion 35 which it joins. End portion 37 joins intermediate portion 36 and is longer than intermediate portion 36 and also longer than the length of opening 32'. In order to assemble the enclosure member 34 over the opening 32', the projecting end 38 of end portion 37 is bent over, as shown in Fig. 1, and the bottom end 39 is inserted between the lower projection 33 and the adjacent edge of opening 32' into junction box compartment 14. Upper end 38 of end portion 37 of closure member 34 is then inserted through opening 32' into the interior of junction box compartment 14 and is then bent upwardly, as shown in Fig. 4. It will now be seen that intermediate portion 36 of closure member 34 extends through the opening 32' between the projections 33 and the adjacent edge of the opening with end portion 37 being arranged inside the junction compartment 14 thus providing a convenient, simple and inexpensive hinge for the closure member 34. Closure member 34 may be secured to side wall 2 by means of a suitable screw 40 extending through an opening 41 in flat portion 35 into a tapped hole 36 in side wall 2.

It will now be seen that this invention provides an improved assembly for a reactive device and an associated capacitor characterized by provision of a unitary enclosing case which permits the introduction of potting compound, the vertical supporting of the reactor core in the plane of its laminations, and the provision of a junction box readily accessible from three sides.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. In combination, an enclosing case having side walls and top and bottom walls, an inner partition in said case defining a junction box compartment and an inner compartment, a reactive device in said inner compartment having a core with coils thereon, said core being secured to at least one of said walls, a capacitor device positioned in said inner compartment and connected to said reactive device, said inner partition having an opening formed therein communicating between said inner and junction box compartments and adapted to admit leads from said devices to said junction box compartment, one of said walls having an opening formed therein communicating with said junction box compartment, and a closure member for said last named opening.

2. In combination, an enclosing case having side walls and top and bottom walls removably secured to said side walls, an inner partition in said case defining a junction box compartment and an inner compartment, a reactive device in said inner compartment and having a core with coils thereon, said core being secured to an opposite two of said walls, a capacitor device positioned in said inner compartment and connected to said reactive device, said inner partition having an opening formed therein communicating between said inner and junction box compartments and adapted to admit leads from said devices to said junction box compartment, one of said walls having an opening formed therein communicating with said junction box compartment, and a closure member for said last named opening.

3. In combination, an enclosing case having side walls and top and bottom walls removably secured to said side walls, an inner partition in said case defining a junction box compartment and an inner compartment, a reactive device vertically arranged in said inner compartment and having a core and coils thereon, said core being secured to said top and bottom walls whereby said reactive device is supported in the plane of said core, a capacitor device positioned in said inner compartment and connected to said reactive device, said inner partition having an opening formed therein communicating between said inner and junction box compartments and adapted to admit leads from said devices to said junction box compartment, one of said side walls having an opening formed therein communicating with said junction box compartment, and a closure member for said last named opening.

4. In combination, an enclosing case having side walls and top and bottom walls removably secured to said side walls, an inner partition in said case joining two of said side walls and defining a junction box compartment in a corner of said case and an inner compartment, a reactive device vertically arranged in said inner compartment and having a core with coils thereon, said core being secured to said top and bottom walls whereby said reactive device is supported in the plane of said core, a capacitor device positioned in said inner compartment and connected to said reactive device, said inner partition having an opening formed therein communicating between said inner and junction box compartments and adapted to admit leads from said devices to said junction box compartment, one of said side walls having an opening formed therein communicating with said junction box compartment, and a closure member for said last named opening.

5. In combination, an enclosing case having side walls and top and bottom walls removably secured to said side walls, an inner partition extending from the top to the bottom of said case joining two of said side walls and defining a junction box compartment in a corner of said case and an inner compartment, a reactive device vertically arranged in said inner compartment and having a core with coils thereon, said core being secured to said top and bottom walls whereby said reactive device is supported in the plane of said core, a capacitor device positioned in said inner compartment and connected to said reactive device, said inner partition having an opening formed therein communicating between said inner and junction box compartments and adapted to admit leads from said devices to said junction box compartment, one of said side walls having an opening formed therein communicating with said junction box compartment, and a closure member for said last named opening.

6. In combination, an enclosing case having side walls and top and bottom walls removably secured to said side walls, an inner partition extending from the top to the bottom of said case joining two of said side walls and defining a junction box compartment in a corner of said case and a substantially L-shaped inner compartment, a reactive device vertically arranged in one leg of said L-shaped compartment and having a core with coils thereon, said core being secured to said top and bottom walls whereby said reactive device is supported in the plane of said core, a capacitor device positioned in the other leg of said L-shaped compartment and connected to said reactive device, said inner partition having an opening formed therein communicating between said inner and junction box compartments and adapted to admit leads from said devices to said junction box compartment, one of said side walls having an opening formed therein communicating with interior of said junction box compartment, and a closure member for said last named opening.

7. In combination, an enclosing case having side walls and top and bottom walls removably secured to said side walls, an inner partition in said case defining a junction box compartment and an inner compartment, a reactive device vertically arranged in said inner compartment and having a core with coils thereon, said core having transverse slots formed in the top and bottom edges thereof, a transverse mounting member positioned in each of said core slots and extending on either side of said core, said mounting members being respectively secured to said top and bottom walls whereby said reactive device is supported in the plane of said core, a capacitor device positioned in said inner compartment and connected to said reactive device, said inner partition having an opening formed therein communicating between said inner and junction box compartments and adapted to admit leads from said devices to said junction box compartment, one of said side walls having an opening formed therein communicating between said inner and junction box compartments and adapted to admit leads from said devices to said junction box compartment, one of said side walls having an opening formed therein communicating with said junction box compartment, and a closure member for said last named opening.

8. In combination, an enclosing case having side walls and top and bottom walls, an inner partition in said case extending from the top to the bottom of said case joining two of said side walls and defining a junction box compartment in a corner of said case and an inner compartment, a reactive device in said inner compartment and having a core with coils thereon, said core being secured to opposite two of said walls, a capacitor device positioned in said inner compartment and connected to said reactive device, said inner partition having an opening formed therein communicating between said inner and junction box compartments and adapted to admit leads from said devices to said junction box compartment, one of said side walls having an opening formed therein communicating with said junction box compartment, an enclosure member for said last named opening, said top and bottom walls and another of said side walls having means formed therein for admitting external leads to said junction box compartment.

9. In combination, an enclosing case having side walls and top and bottom walls, an inner partition in said case defining a junction box compartment and an inner compartment, a reactive device in said inner compartment and having a core with coils thereon, said core being secured to at least one of said walls, a capacitor device positioned in said inner compartment and connected to said reactive device, said inner partition having an opening formed therein communicating between said inner and junction box compartments and adapted to admit leads from said devices to said junction box compartment, a mass of substantially solidified insulating material substantially filling said inner compartment and encasing said devices, one of said walls having an opening formed therein communicating with said junction box compartment, and an enclosure member for said last named opening.

10. In combination, an enclosing case having side walls and top and bottom walls, an inner partition in said case defining a junction box compartment and an inner compartment, a reactive device in said inner compartment and having a core with coils thereon, said core being secured to at least one of said walls, a capacitor device positioned in said inner compartment and connected to said reactive device, said inner partition having an opening formed therein communicating between said inner and junction box compartments and adapted to admit leads from said devices to said junction box compartment, one of said walls having an opening formed therein communicating with said junction box compartment, an enclosure member for said last named opening, said closure member having a flat portion overlying said last-named opening, an intermediate portion joining one edge of said flat portion and disposed in a plane at an angle thereto, said intermediate portion being shorter than said one edge of said flat portion and extending through said last-named opening, an end portion arranged in said junction box compartment and joining said intermediate portion, said end portion being longer than said last-named opening thereby forming a hinge for said closure member, and means for securing said closure member to said one wall.

11. In combination, an enclosing case having side walls and top and bottom walls removably secured to said side walls, said top and bottom walls respectively having mounting portions formed thereon, an inner partition in said casing extending from the top to the bottom of said case joining two of said side walls and defining a junction box compartment in a corner of said case and a substantially L-shaped inner compartment, a reactive device vertically arranged in one leg of said L-shaped compartment and having a core with coils thereon, said core having transverse slots formed in the top and bottom edges thereof, a transverse mounting member positioned in each of said core slots and extending on either side of said core, said mounting members being respectively secured to said top and bottom walls whereby said reactive device is supported in the plane of said core, a capacitor device positioned in the other leg of said L-shaped compartment and connected to said reactor device, said inner partition having an opening formed therein communicating between said inner compartment and said junction box compartment and adapted to admit leads from said devices to said junction box compartment, a mass of substantially solidified insulating material substantially filling said inner compartment encasing said devices, one of said side walls having an opening formed therein communicating with said junction box compartment, a closure member for said last named opening, said top and bottom walls and another of said side walls having means formed therein for admitting external leads to said junction box compartment.

References Cited in the file of this patent

UNITED STATES PATENTS

| | | |
|---|---|---|
| 808,766 | Lehmann | Jan. 2, 1906 |
| 1,976,720 | Engels | Oct. 16, 1934 |
| 1,978,098 | Alexander et al. | Oct. 23, 1934 |